(12) United States Patent
Fueki

(10) Patent No.: US 6,226,245 B1
(45) Date of Patent: *May 1, 2001

(54) CONTROL SYSTEM FOR CONTROLLING THE ROTATIONAL SPEED OF A DISC TO A MAXIMUM SPEED WITHOUT CAUSING EXCESSIVE VIBRATION

(75) Inventor: Hiroyuki Fueki, Saitama-ken (JP)

(73) Assignee: Pioneer Electronic Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/922,531

(22) Filed: Sep. 3, 1997

(30) Foreign Application Priority Data

Sep. 3, 1996 (JP) .................................................. 8-252288

(51) Int. Cl.[7] ......................................................... G11B 7/00
(52) U.S. Cl. ............................................................ 369/50
(58) Field of Search ................................ 369/50, 48, 47, 369/53

(56) References Cited

U.S. PATENT DOCUMENTS

| 5,694,380 | * | 12/1997 | Shimizume et al. | 369/47 |
| 5,701,284 | * | 12/1997 | Lee | 369/60 |
| 5,740,140 | * | 4/1998 | Arataki et al. | 369/60 |
| 5,740,356 | * | 4/1998 | Liang et al. | 369/53 |
| 5,768,233 | * | 6/1998 | Akahira et al. | 369/50 |
| 5,774,437 | * | 6/1998 | Yoshida | 369/50 |
| 5,802,026 | * | 9/1998 | Tsukihashi | 369/48 |
| 5,805,548 | * | 9/1998 | Ishihara et al. | 369/50 |
| 5,808,990 | * | 9/1998 | Summers | 369/50 |
| 5,815,478 | * | 9/1998 | Kim | 369/50 |
| 5,825,732 | * | 10/1998 | Arataki | 369/50 |
| 5,844,866 | * | 12/1998 | Fujimoto et al. | 369/50 |
| 5,844,872 | * | 12/1998 | Kubo et al. | 369/50 |
| 5,862,113 | * | 11/1999 | Tsuyuguchi et al. | 369/50 |
| 5,886,966 | * | 3/1999 | Ota et al. | 369/50 |

* cited by examiner

Primary Examiner—Nabil Hindi
(74) Attorney, Agent, or Firm—Arent Fox Kintner Plotkin & Kahn, PLLC

(57) ABSTRACT

A reading device is provided for reading information recorded on an optical disc. A relative displacement between the reading device and the optical disc is detected. The relative displacement is caused by rotating the disc at a speed higher than an ordinary speed. A maximum rotating speed of the optical disc at the time when the displacement reaches a predetermined value is detected. The optical disc is rotated at an angular velocity which does not exceed the maximum rotating speed.

5 Claims, 12 Drawing Sheets

→ TIME

CONTROL SYSTEM FOR CONTROLLING THE ROTATIONAL SPEED OF A DISC TO A MAXIMUM SPEED WITHOUT CAUSING EXCESSIVE VIBRATION

BACKGROUND OF THE INVENTION

The present invention relates to a system for reading information from a disc, such as a CD-ROM, with random access, wherein the access time is decreased.

A CD (compact disc), which is generally used for recording and reproducing music, has a large memory capacity so that it has become common to use the CD as a ROM for the computer. Such a memory is called a CD-ROM and stores digital data and programs instead of audio signals in an information recording area formed on a predetermined portion of the disc. The disc has a plurality of pits which are arranged spirally from an inner portion of the disc toward an outer portion. An innermost portion forms a lead-in area and a portion outside the innermost portion forms a data recording area. A lead-out area is formed outside the recording area within a rage of a predetermined radial position.

The lead-in area stores information for identifying these area formed on the disc, and data on table of contents (TOC) of information, such as data and programs for operating a computer which are stored in the recording area. The TOC data comprises block address information in the form of block numbers and time information. An optical pickup reads the TOC data in the lead-in area to calculate the radial position of the disc at which desired data is recorded. The pickup thus traces the pits from the inner to the outer portions of the disc to read out the information recorded on the disc. Since the CD-ROM discs can be mass-produced at a low cost, they are considered as a typical medium for a multimedia system.

The CD-ROM stores, as recording information, data for the computer and compressed digital data instead of audio information. From the point of increasing the recording density, the information is recorded under the constant linear velocity (CLV) control as in the ordinary CDs.

If the CD-ROM is used as an external ROM of a computer, it is desirable to reduce the access time needed to position the optical pickup and to read out information. When reading the information from the CLV controlled disc, in order to maintain the linear velocity constant, the rotational speed of the disc must be changed. Namely, at the innermost portion of the recording area, the rotational speed is so controlled that the angular velocity is maximum. The rotational speed is decreased in accordance with the radial position of the pickup so that the angular velocity is decreased.

There is a demand for increasing the recording and reproducing speed per unit time in a CD-ROM drive for operating the CD-ROM. In order to comply with the demand, it is necessary to increase the rotational speed of the disc.

A CD-ROM drive capable of rotating the disc much faster than usual is currently on the market. Such a CD-ROM drive can read out and store a large quantity of information in a short time, for example, at a rate of 8-multiplied (8×) speed, and transfers the information to an external device connected to the CD-ROM drive at an ordinary transfer rate thereof.

However, when a disc with a large imbalance is reproduced at eight times the normal speed, the rotational speed becomes about 4300 r.p.m. at the inner portion of the disc. Such a high speed causes severe vibration, rendering external disturbances to be exerted on the servo systems of the CD-ROM drive. Thus the reading of the information becomes insecure.

If the information on the disc cannot be read because of the vibration, the rotational speed is reduced to four times the normal speed, or the rotational speed is gradually decreased for another try. The rereading operation may be repeated several times so that the performance of the CD-ROM drive is largely deteriorated. More particularly, regardless of the degree of the imbalance of the disc, the high rotational speed causes a lead-in error in the track-following servo system so that the attempt to read must be made a number of times before finally succeeding. As a result, the time it takes to read the information is elongated.

SUMMARY OF THE INVENTION

An object of the present invention is to provide a system for reading information from a disc wherein the information can be quickly and stably read out.

According to the present invention, there is provided a system for reading information recorded on a disc comprising, a reading device for reading information recorded on an optical disc, a rotating device for rotating the optical disc, control means for controlling the rotational device so as to rotate the disc at a higher speed than an ordinary speed, detector means for detecting a relative displacement between the reading device and the optical disc, caused by rotating the disc by the rotating device at a speed higher than an ordinary speed under the control of the control means, determining means for determining that the displacement reaches a predetermined value, rotating speed detector means for detecting a maximum rotating speed of the optical disc at the time when the displacement reaches the predetermined value.

The control means is provided for controlling the rotating device so as to rotate the optical disc at an angular velocity which does not exceed the maximum rotating speed.

Calculating means is further provided for calculating a radial position of the reading device at the maximum rotating speed. The control means is also provided for controlling the rotating device so as to rotate the optical disc at a constant angular velocity in order to read information recorded in an area inner than the calculated radial position.

The control means is further provided for controlling the rotating device so as to rotate the optical disc at a constant linear velocity in order to read information recorded in an area outer than the calculated radial position.

These and other objects and features of the present invention will become more apparent from the following detailed description with reference to the accompanying drawings.

BRIEF DESCRIPTION OF DRAWINGS

FIG. 2a is a flowchart describing the operation of the CD-ROM reading system of FIG. 1;

FIG. 2b is a flowchart describing a step for controlling the rotation of the disc, shown in the flowchart of FIG. 2a;

FIG. 3a is a graph showing a tracking error signal of the CD-ROM reading system of FIG. 1;

FIG. 3b is a graph showing a binary pulse signal produced in accordance with the tracking error signal of FIG. 3a;

FIG. 3c is a graph showing a tracking error signal when a track-following servo system is closed;

FIG. 3d is a graph showing a tracking actuator driving signal produced in accordance with the tracking error signal of FIG. 3c;

FIG. 6a is a diagram showing a circuitry of a detector for detecting the tracking actuator driving signal in the third embodiment of the present invention;

FIG. 6b is a diagram showing a circuitry of a modification of the detector of FIG. 6a;

DETAILED DESCRIPTION OF THE PREFERRED EMBODIMENT

Figure 1:
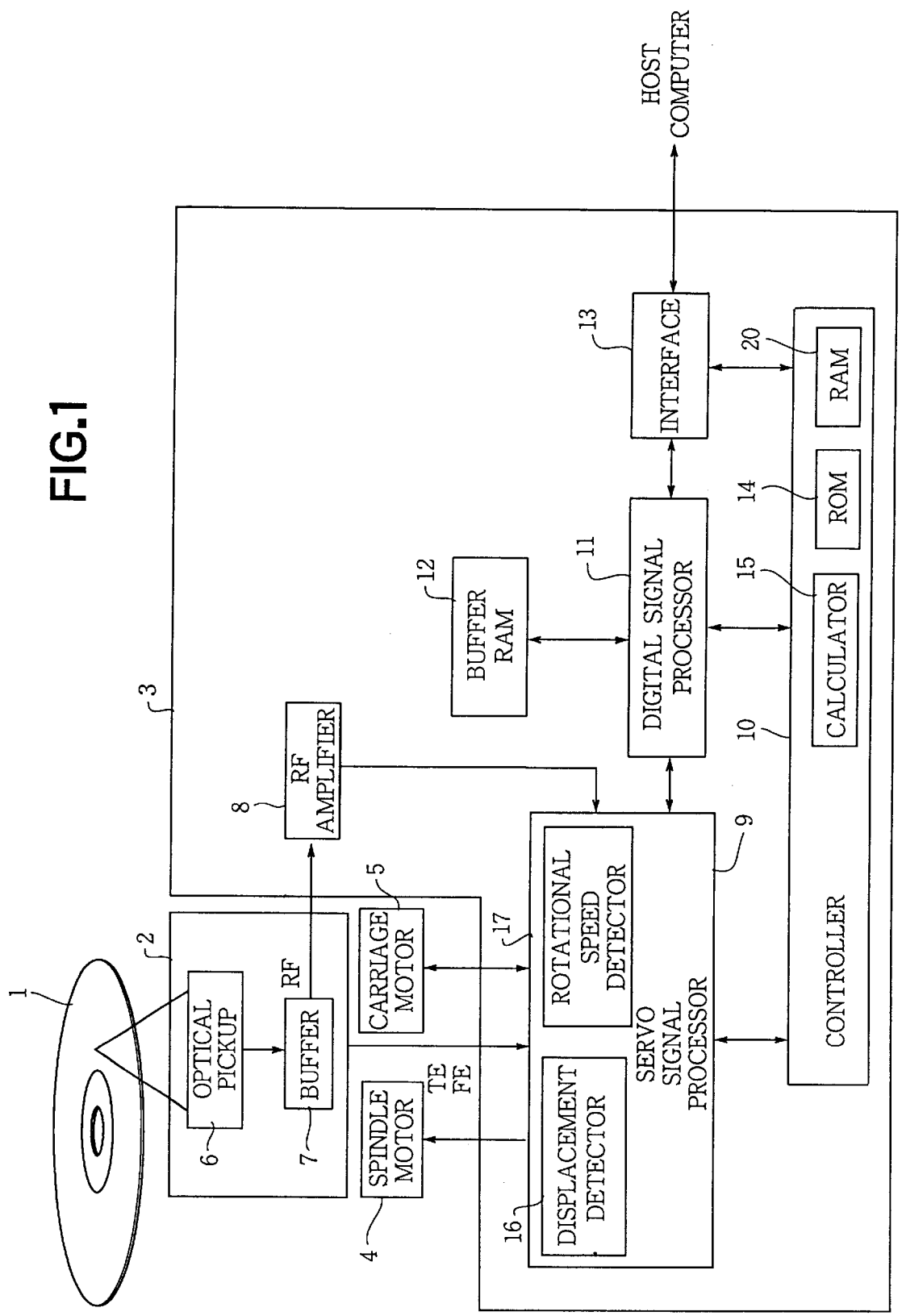
FIG. 1 is a schematic block diagram of a CD-ROM reading system capable of reading a disc at N-multiplied speed according to the present invention.

Referring to FIG. 1, a CD-ROM reading system which reads out information recorded on a CD-ROM disc 1 of the present invention has a pickup section 2 for reading out the information from the disc 1 and converting the information into electric signals, and a signal processing section 3 for processing the electric signals so as to be transferred to a host computer (not shown), connected thereto. The CD-ROM reading system further has a spindle motor 4 for rotating the disc 1, and a carriage motor 5 for moving a carriage (not shown) supporting the pickup section 2.

The pickup section 2 comprises an optical pickup 6 which emits a detector light focused on a pit formed on the disc 1 and converts a reflected light thereof into a current signal. The current signal is fed to a buffer 7 which coverts the current signal into a voltage signal through an equivalent input resistor having a predetermined resistance. An RF signal RF, focus error signal FE and a tracking error signal TE are obtained from the voltage signal and are fed to the signal processing section 3.

The signal processing section 3 comprises a servo signal processor 9 for generating various signals for controlling the optical pickup 6, spindle motor 4 and the carriage motor 5, digital signal processor 11 for processing the RF signal and applying the processed RF signal to the host computer through an interface 13, and a controller 10 having a calculator 15, ROM 14 and a RAM 20. The controller 10 controls the servo signal processor 9, digital signal processor 11 and other devices provided in the signal processing section 3 in accordance with predetermined programs stored in the ROM 14.

The focus error signal FE, tracking error signal TE and the RF signal RF which is amplified by an RF amplifier 8 are applied to the servo signal processor 9. The servo signal processor 9 generates various servo signals including a focus actuator driving signal for operating a focus actuator provided in the optical pickup 6, tracking actuator driving signal for operating a focus actuator in accordance with the input signals, thereby operating a focus servo system to accurately position the optical pickup 6. Servo signals for controlling a carriage servo system and a spindle servo system are also generated.

The servo signal processor 9 is further provided with a displacement detector 16 and a rotational speed detector 17. The displacement detector 16 detects a relative tracking displacement between the optical pickup 6 and the pits, or tracks, being traced by the pickup 6 in accordance with the tracking error signal. The rotational speed detector 17 detects the rotational speed of the disc 1.

The calculator 15 of the controller 10 is fed with a position detecting signal from a pickup position sensor (not shown) provided in the CD-ROM reproducing system which detects the position of the detector light emitted from the optical pickup 6 and focused on the disc 1. The calculator 15 calculates the radial position of the optical pickup 6 in accordance with the position detecting signal.

The controller 10 is further provided with a rotational speed controller (not shown), which, for example sets and resets a rotational speed control flag based on the servo signal processor 9 and the digital signal processor 11 and generates a control signal dependent on the condition of the flag. The control signal is fed to the servo signal processor 9 which in turn applies the spindle servo signal to the spindle motor 4 which integrally rotates the disc 1, thereby controlling the rotational speed of the disc. Another control signal is applied to the servo signal processor 9 for controlling the carriage servo system so that the carriage motor 5 is driven to position the optical pickup 6 at a desired radial position.

In accordance with the present invention, the relative tracking displacement detected by the displacement detector 16 is fed to the calculator 15. The controller 15 calculates an eccentricity, which is a difference between the center of the tracks formed on the disc and the center of the central hole of the disc generated when the disc 1 is manufactured. The eccentricity of the disc 1 is calculated based on the relative displacement generated at a low rotational speed, such as at the start of the rotation. The calculated eccentricity is stored in the RAM 20.

As the rotational speed is increased, the suspensions supporting an objective of the pickup 6, the carriage on which the pickup 6 is mounted, damper engaged with the spindle motor 4, and the housing of the pickup are vibrated, thereby causing additional vibration. An additional vibrational quantity is added to the eccentricity so that the detected displacement is increased. When the additional vibrational quantity becomes excessively large, the servo systems cannot correct the focus and tracking errors so that the information written on the disc 1 cannot be reproduced. The ROM 14 stores a maximum allowable vibrational quantity as a reference value at which the CD-ROM reading system can be operated.

The calculator 15 calculates the additional vibrational quantity in accordance with the relative displacement detected by the displacement detector 16 and the eccentricity stored in the RAM 20. When the additional vibrational quantity reaches the maximum allowable vibrational quantity, the rotational speed at that time detected by the rotational speed detector 17 is stored as a maximum allowable rotational speed in the RAM 20. A radial position at which the optical pickup 6 is located when the disc 1 is rotated at the maximum allowable rotational speed under the CLV control is determined and stored in the RAM 20 as a reference radial position. When reading the information stored in the tracks inside the set reference radial position, the disc 1 is rotated at the maximum allowable rotational speed, that is the speed at which the servo systems can be accurately operated. When reading the information stored in the tracks outside the set reference radial position, the rotational speed of the disc 1 is controlled in accordance with the CLV, enabling to read the information at the N-multiplied speed.

The RF signal is applied to the digital signal processor 11 which executes an error correction and stores the information derived from the RF signal in a buffer RAM 12 which is a de-interleave memory. The information is retrieved form the buffer RAM 12 at a predetermined timing and transferred to the host computer through the interface 13 at an ordinary transfer rate set by the controller 10.

The operation for controlling the rotational speed of the disc 1 in accordance with the radial position thereof is described hereinafter with reference to FIGS. 2a and 2b.

Figure 2:
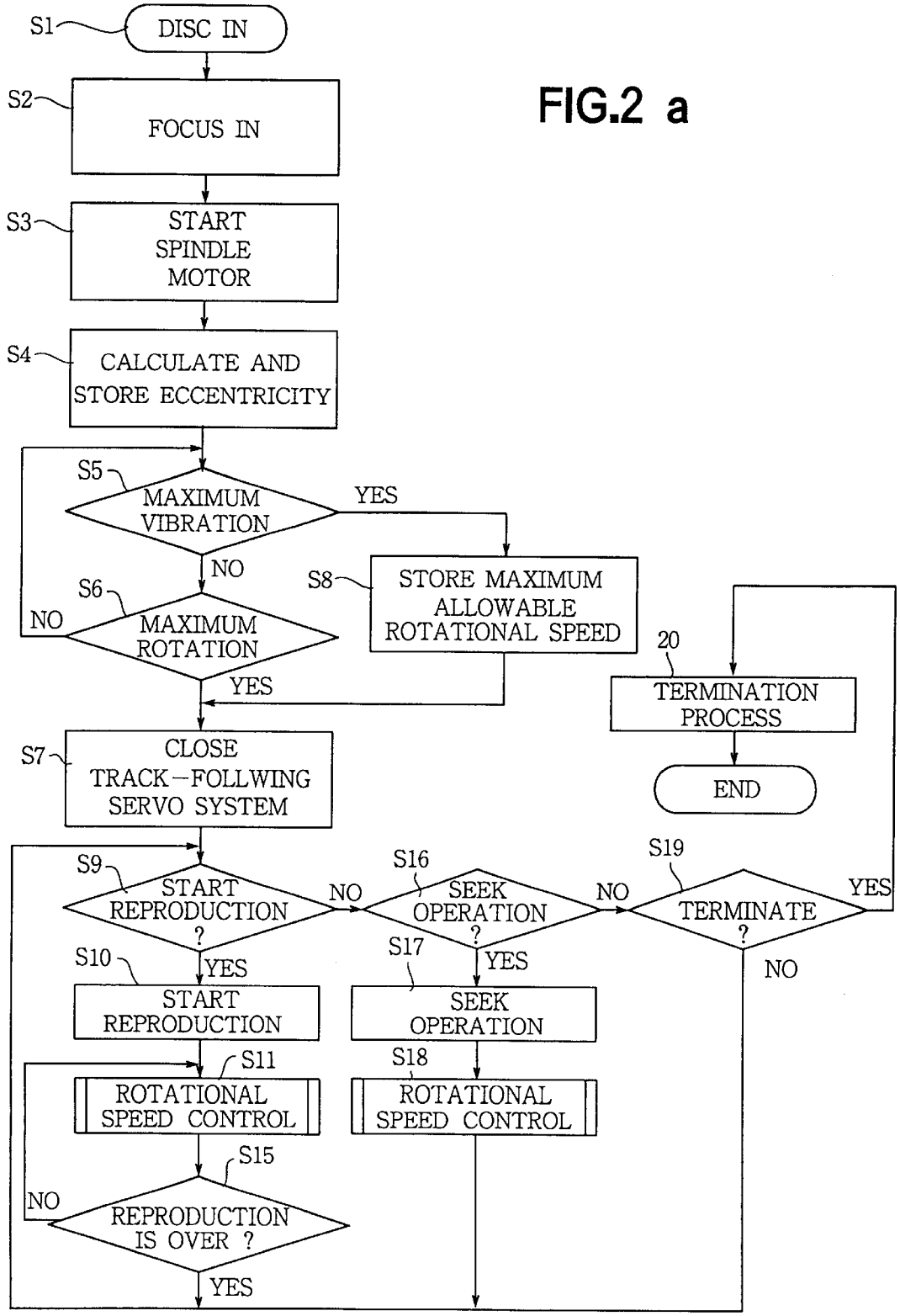
Figure 2:
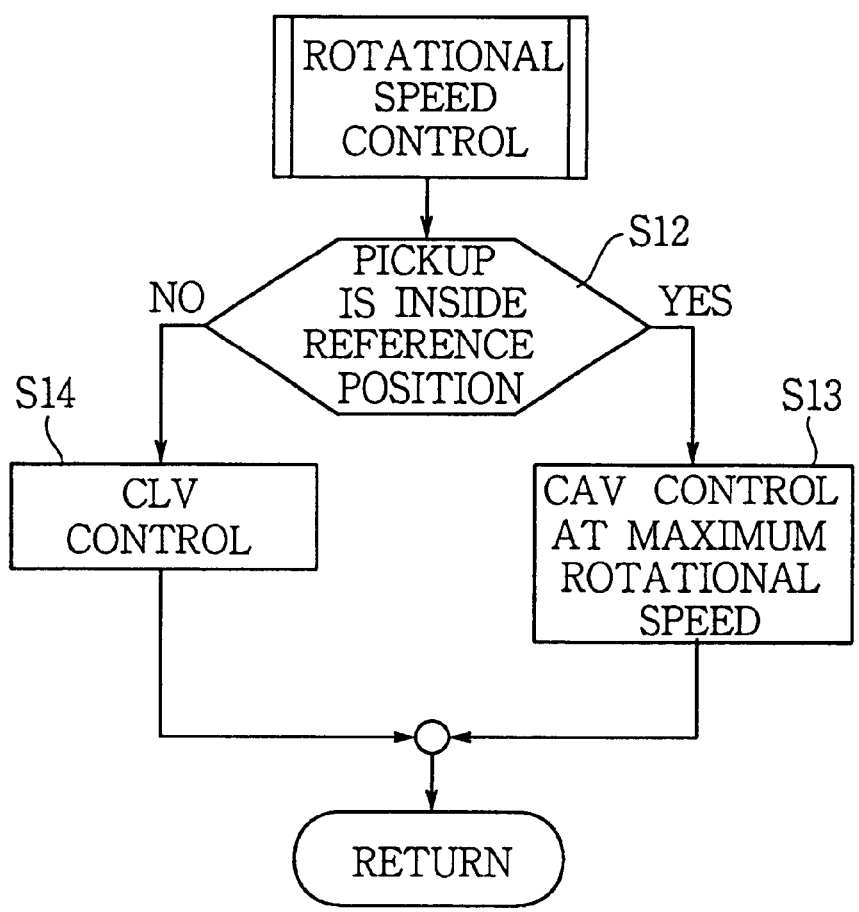

Referring to FIG. 2a, at a step S1, the CD-ROM disc 1 is loaded in the CD-ROM reading system to start the reading of the information stored therein. At a step S2, the optical pickup 6 of the pickup section 2 is fixed at an innermost radial position of the recording area of the disc 1 and the carriage motor 5 is kept inoperative. Namely the track-following servo system of the CD-ROM reading system is opened, so that the pickup 6 stops at a position. The optical pickup 6 emits a detector light which is focused on a pit of the disc 1. The reflected light is converted into the RF signal at the pickup section 2, and the RF signal is applied to the digital signal processor 11 of the signal processing section 3. The digital signal processor 11 converts the RF signal into a comparated signal in accordance with a predetermined threshold. If the detector light is correctly focused, a focus-in signal is fed to the rotational speed controller of the controller 10, which in turn applies the control signal to the servo signal processor 9.

Figure 3:
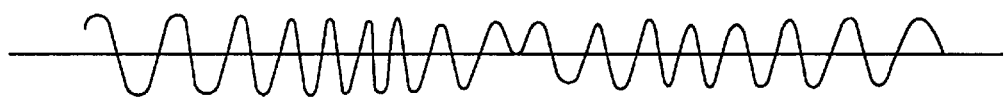
Figure 3:
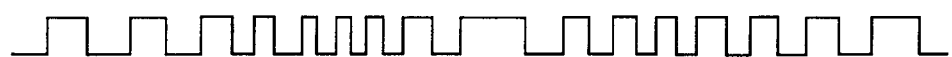
Figure 3:
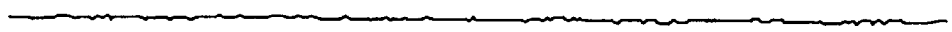
Figure 3:
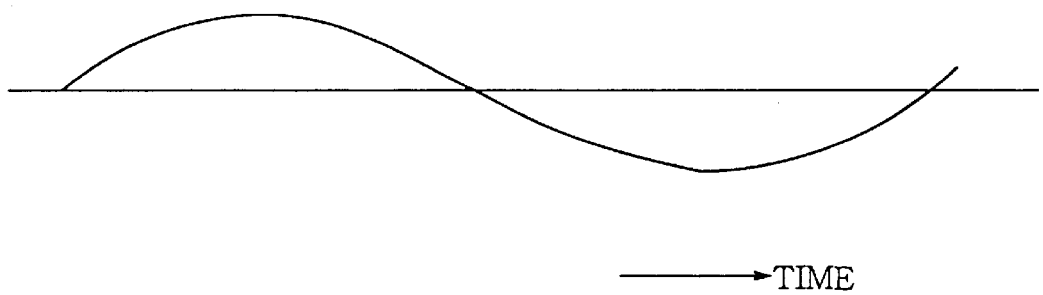

At a step S3, the servo signal processor 9 operates the spindle motor 4, thereby rotating the disc 1. The tracking error signal TE is hence generated as shown in FIG. 3a, if the disc is eccentric with respect to the center of the rotation. The disc 1 is rotated at a low speed so that the vibrations caused by the suspensions supporting the objective of the pickup 6, the carriage on which the pickup 6 is mounted, clamper engaged with the spindle motor 4, and the housing of the pickup are not included in the tracking error signal. Namely, the tracking error is caused by the eccentricity of the tracks, and hence each wave of the signal TE generates when the track crosses the spot of the pickup. Hence the maximum eccentricity is detected each time the disc 1 is rotated one half of the rotation.

The tracking error signal TE is fed to the digital signal processor 11 so as to be converted into a binary pulse signal shown in FIG. 3b which is fed to the calculator 15 of the controller 10. The calculator 15 calculates the eccentricity of the tracks based on the pulse signal. Namely, a time taken for the disc 1 to make one half or one rotation and the number of the pulses for the time which is detected by a frequency generator (not shown) mounted on the spindle motor 4 are obtained. The number of the pulses during the half rotation is multiplied by a track pitch which is, in the case of CDs, about 1.6 $\mu$m, so that the eccentricity is calculated. The calculated eccentricity is stored in the RAM 20 at a step S4.

Thereafter, the rotational speed of the spindle motor 4 is increased in accordance with the control signal fed from the rotational speed calculator of the controller 10. As a result, the suspensions supporting the objective of the pickup 6, the carriage on which the pickup 6 is mounted, damper engaged with the spindle motor 4, housing of the pickup 6 are vibrated, thereby generating the additional vibrational quantity, which is included in the tracking error signal TE.

At a step S5, the displacement detector 16 detects the relative displacement between the optical pickup 6 and a pit, or the track which the pickup is following. The calculator 15 calculates the additional vibrational quantity by subtracting the eccentricity stored in the RAM 20 at the step S4 from the relative displacement and compares it with the maximum allowable vibrational reference quantity stored in the ROM 14. If the additional vibrational quantity is smaller than the maximum allowable vibrational quantity, the program goes to a step S6 where the rotational speed at that time is compared with a maximum rotational speed capable by the CLV to provide the N-multiplied speed. When the rotational speed is lower than the maximum rotational speed of the CLV, the spindle motor 4 further increases the speed thereof and returns to the step S5. When it is determined at the step S6 that the speed reached the maximum rotational speed, the program proceeds to a step S7.

When the additional vibrational quantity becomes the maximum allowable vibrational quantity at the step S5, the rotational speed at that time detected by the rotational speed detector 17 is stored in the RAM 20 as the maximum allowable rotational speed at a step S8. Furthermore, at the maximum allowable vibration, the calculator 15 calculates a maximum radial inner position of the disc where the pickup cannot read the data under the CLV control in the inner area than the maximum position. Therefore, the data in the inner area are read out under the CAV (constant angular velocity control. The maximum inner position is also stored in the RAM 20. Thereafter, the program goes to the step S7.

At the step S7, the track-following servo system is closed. The optical pickup 6 reads out the TOC data and other information stored in a lead-in area inner side of the recording area of the disc 1. The read out information is stored in the buffer RAM 12. The pickup 6 is positioned at the home position adjacent the innermost track of the recording area, and awaits a disc reproduction command at a step S9. When the disc reproduction command is applied, the reproduction of the disc 1 is started at a step S10, and at a step S11, the rotational speed of the spindle motor 4 is controlled while the focus servo system and the track-following servo system are operated.

The rotational speed control operation is described in FIG. 2b. At a step S12, the calculator 15 calculates a radial position of the detector light from the optical pickup 6 in accordance with the output signal of the pickup position sensor. The detected radial position is compared with the reference maximum inner position stored in the RAM 20 at the step S8. When the current position is inside the reference inner position, at a step S13, the spindle motor 4 is rotated at the maximum allowable speed at the constant angular velocity (CAV). If the current position becomes outside the reference position, the spindle motor 4 is controlled in accordance with the CLV (step S14) which corresponds to the N-multiplied speed.

Figure 10:
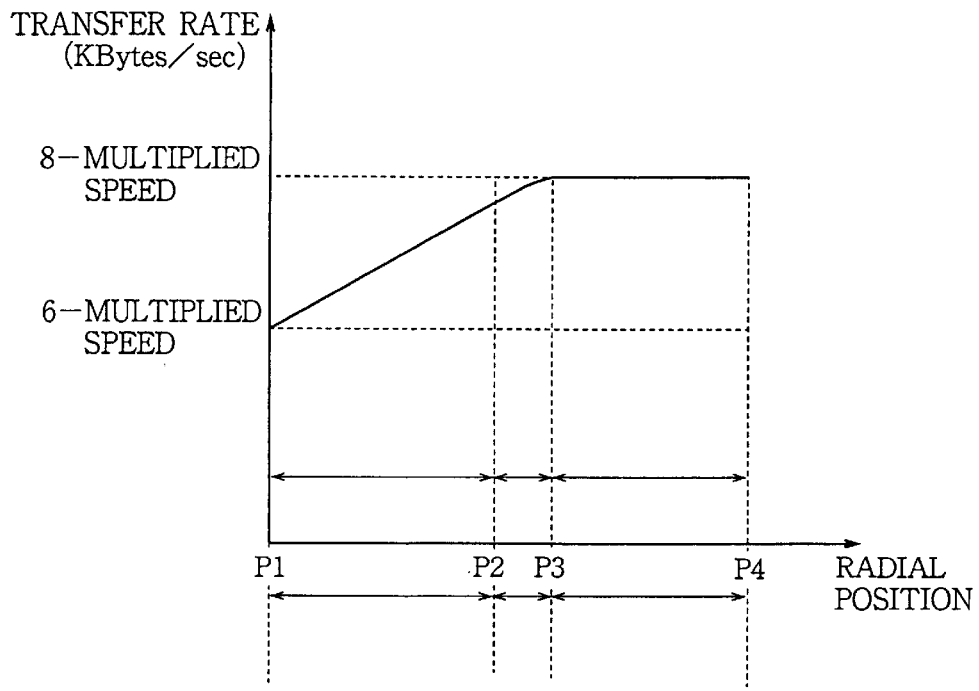
FIG. 10a is a graph showing a relationship between a transfer rate and a radial position of a disc.
FIG. 10b is a graph showing a relationship between a rotational speed and a radial position of a disc.
Figure 10:
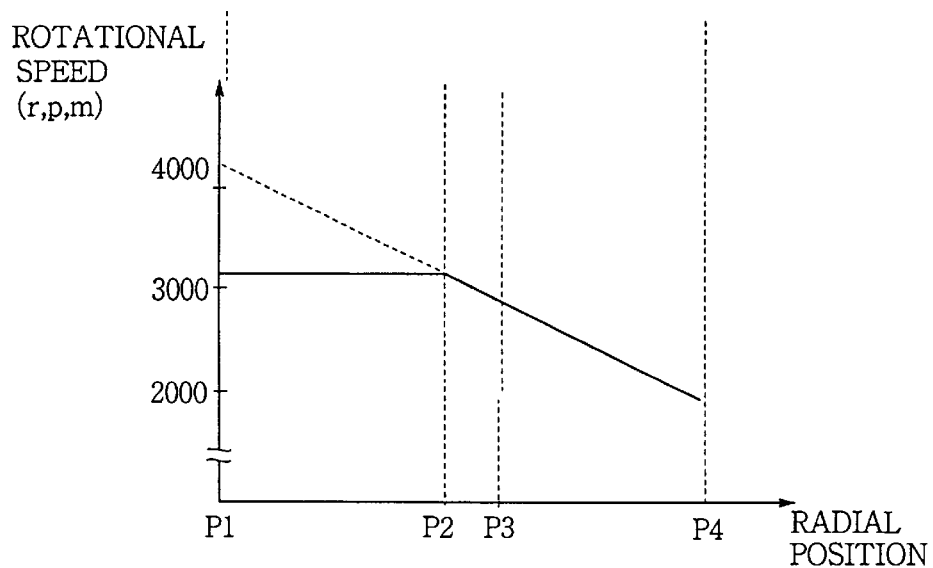

More particularly, as shown in FIG. 10b, in a range between the innermost radial position P1 of the recording area and the reference inner position P2, the spindle motor 4 is rotated at a constant rate of the maximum allowable rotational speed under the CAV control as shown by the solid line. Hence the information is quickly and stably read out while increasing the transfer rate from 6-multiplied speed to 8-multiplied speed in the present embodiment as shown in FIG. 10a. On the other hand, in a range between the reference inner position P2 and the outermost position P4 of the recording area, the rotational speed is gradually decreased using CLV as shown in FIG. 10b. Therefore, as shown in FIG. 10a, information is read at the maximum N-multiplied speed, in the case of the present embodiment, 8-multiplied speed. The range between the reference radial position P2 and a radial position P3 is a transition range.

The information read out from the disc 1 is sequentially stored in the buffer RAM 12 at a predetermined timing. The stored information is further sequentially applied to the host computer through the interface 13 at a transfer rate set by the controller 10.

Thereafter, the program goes to a step S15 of FIG. 2a where it is determined whether the reproduction of the information is finished. If the reproduction is not yet over, the step S11 is repeated, thereby continuing the reading of the information. If the reproduction is over, the program returns to the step S9.

When the step S9 determines that there is no reproduction command, the program goes to a step S16 where it is determined whether a seek operation is required so that a desired information can be read out. If the seek operation is required, the optical pickup 6 is moved to a position where the desired information is stored. The current position of the pickup obtained dependent on the output signal of the pickup position sensor is compared with the address data dependent on the TOC data stored in the buffer RAM 12 at the step 7. Thus the optical pickup is quickly moved to the desired position. The seek operation can also be carried out by address search operation where a track jump is executed, for example, based on the address data of the TOC data.

At a step S18, the rotation speed control which is that same as that shown in FIG. 2b is executed.

When the seek operation is not necessary, the program goes from the step S16 to a step S19 to determine whether the reading of the information is to be terminated. When the answer is YES, a termination operation is carried out at a step S20, thereby ending the entire operation.

The additional vibrational quantity obtained at the step S4 can be used to control other control systems of the CD-ROM reading system than the servo systems.

In the second embodiment of the present invention, the ROM 14 stores, instead of the maximum allowable vibrational quantity, a maximum allowable displacement which is the maximum detected relative displacement under which the servo systems can be operated. The ROM 14 further stores a maximum eccentricity within a standard eccentricity range set for the production of the CD-ROM discs.

Figure 4:
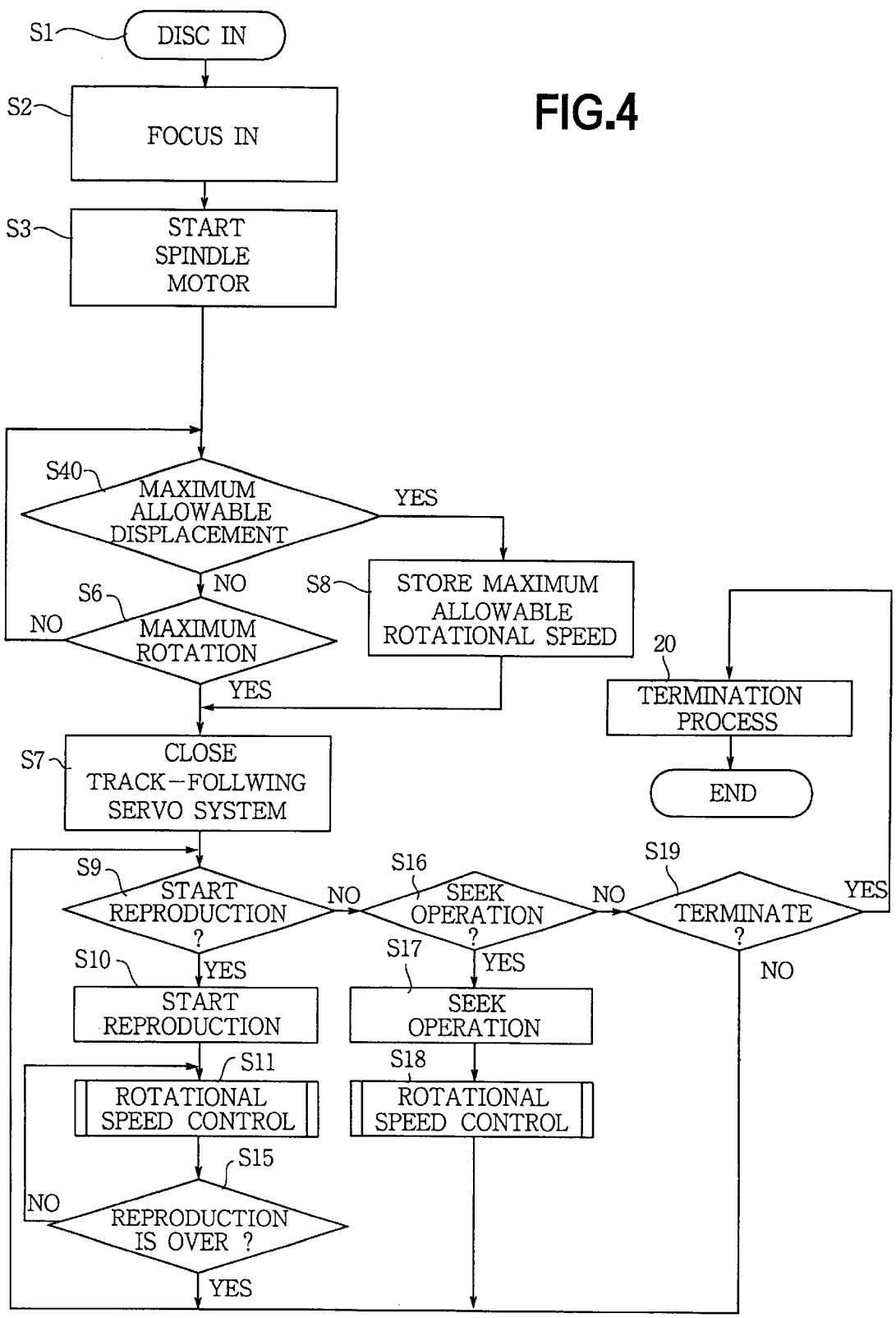
FIG. 4 is a flowchart describing the operation of the CD-ROM reading system of a second embodiment of the present invention.

As shown in FIG. 4, after the spindle motor 4 is started at the step S3, the program goes to a step S40 where the detected relative displacement is compared with the stored maximum allowable displacement. When the detected displacement coincides with the maximum allowable displacement, the program goes to the step S8 where the rotational speed causing the maximum allowable displacement is stored in the RAM 20. Other operations are the same as those in the first embodiment and the steps shown in FIG. 2a are shown in FIG. 4 designated by the same references.

In the third embodiment, the present invention is modified so that the eccentricity and the relative displacement are calculated in accordance with the tracking actuator driving signal obtained when the track-following servo system is closed.

Figure 5:
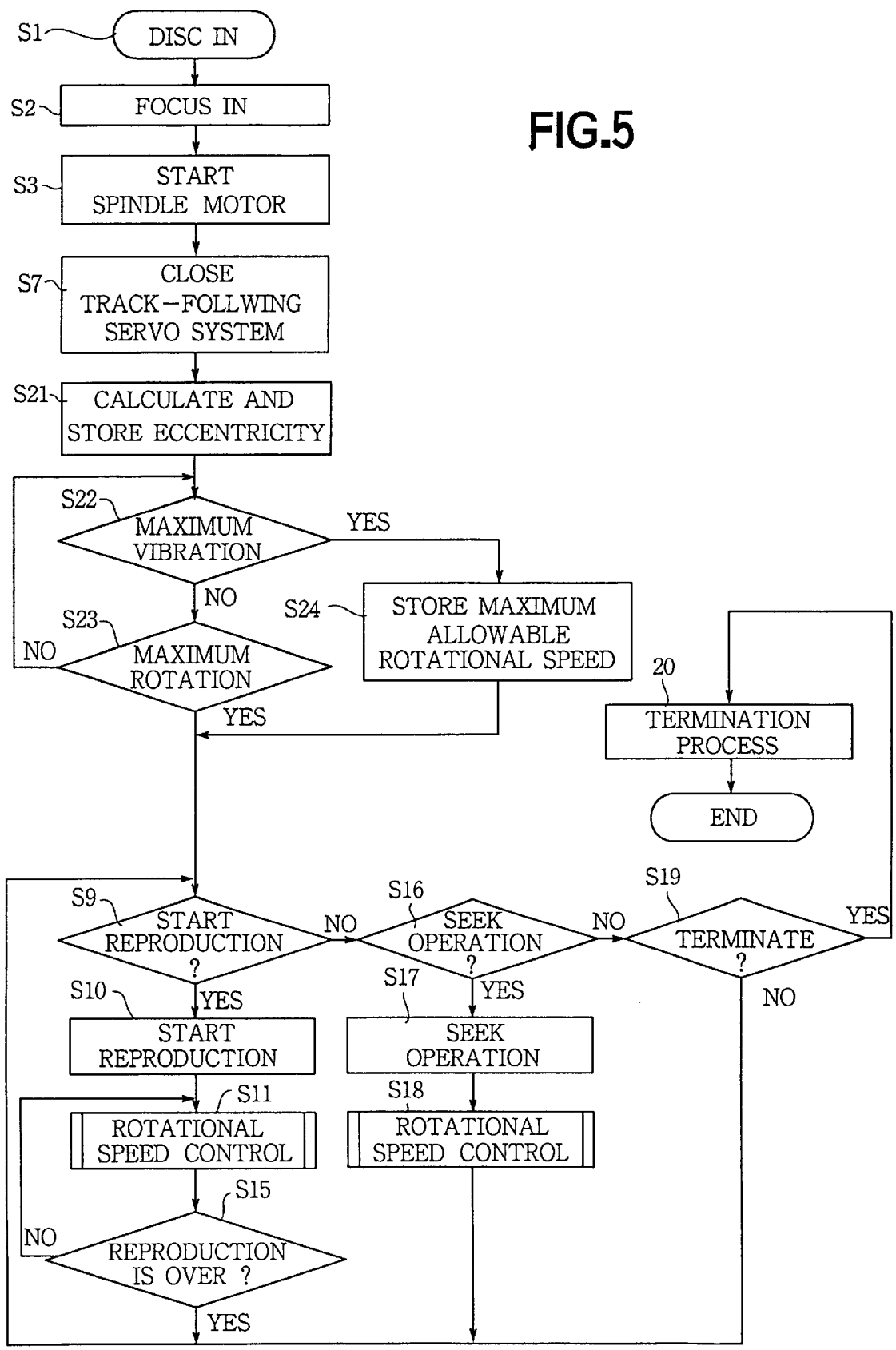
FIG. 5 is a flowchart describing the operation of the CD-ROM reading system of a third embodiment of the present invention.

Referring to FIG. 5, in the present embodiment, after the spindle motor 4 is driven, the program jumps to the step S7 of the flowchart in FIG. 2a, thereby closing the track-following servo system. Thus a compressed tracking error signal TE as shown in FIG. 3c is generated at the pickup section 2. The actuator driving signal for operating the tracking actuator to correct the tracking error is generated in accordance with the tracking error signal as shown in FIG. 3d. The tracking actuator is controlled in accordance with the actuator driving signal so that the displacement of the detector light is restrained. FIG. 3d shows the actuator driving signal generated during one rotation of the disc 1. Since the actuator driving signal is proportional to the relative displacement of the optical pickup 6, the displacement can be calculated from the amplitude of the actuator driving signal.

Namely, the program goes to a step S21 where the displacement detector 16 detects the actuator driving signal during one rotation of the disc 1 at a predetermined low rotational speed, for example, about 1000 r.p.m. in a CD-ROM reading system capable of reading information at 8-multiplied speed. The actuator driving signal is fed to the calculator 15 of the controller 10 where a maximum amplitude of the actuator driving signal, that is the displacement, is calculated. The calculated displacement, which corresponds to the eccentricity of the disc 1, is stored in the RAM 20.

Figure 6:
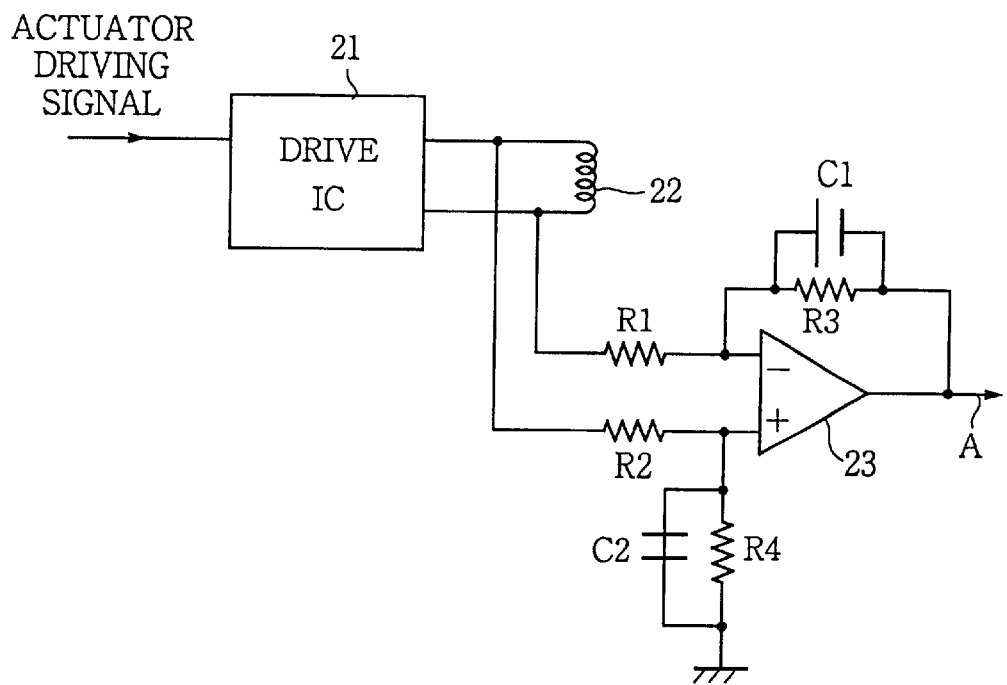
Figure 6:
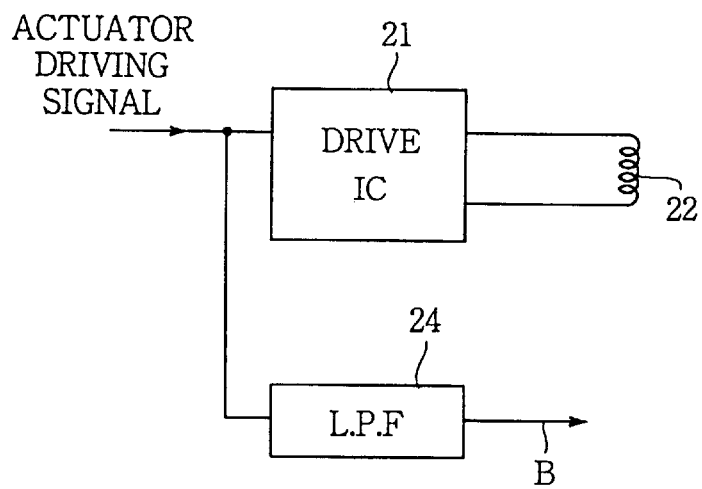

Referring to FIG. 6a, an example of a circuitry of the displacement detector 16 comprises a drive IC 21 which is connected to the ends of a tracking actuator coil 22 for driving a lens of the pickup, and a comparator 23, the input terminals of which are also connected to the ends of the coil 22. When the actuator driving signal is applied to the drive IC 21, the comparator 23 generates an output signal A corresponding to a difference of the outputs of the drive IC 21.

FIG. 6b shows another example of the displacement detector 16 having the drive IC 21 connected to the coil 22 of the tracking actuator, and a low pass filter (LPF) 24. The actuator driving signal fed to the drive IC 21 is applied to the LPF 24 to generate an output signal B.

The program proceeds from the step S21 to a S22 where the rotational speed of the spindle motor 4 is increased. The displacement detector 16 detects the relative displacement between the optical pickup 6 and the track, and the calculator 15 calculates the additional vibrational quantity by subtracting the eccentricity stored in the RAM 20 at the step S21 from the relative displacement and compares it with the maximum allowable vibrational quantity stored in the ROM 14. If the additional vibrational quantity is smaller than the maximum allowable vibrational quantity, the program goes to a step S23 where the rotational speed at that time is compared with the maximum rotational speed capable by the CLV. When the rotational speed is lower than the maximum rotational speed of the CLV, the spindle motor 4 further increases the speed thereof and returns to the step S22. When it is determined at the step S23 that the speed reached the maximum rotational speed, the program proceeds to the step S9 for reading out the information from the disc 1.

When the additional vibrational quantity becomes the maximum allowable vibrational quantity at the step S22, the rotational speed at that time detected by the rotational speed detector 17 is stored in the RAM 20 as the maximum allowable rotational speed at a step S24. Furthermore, at the maximum allowable vibration, the calculator 15 calculates a maximum radial inner position of the disc where the pickup cannot read the data under the CLV control in the inner area than the maximum position. Therefore, the data in the inner area are read out under the CAV control. The maximum inner position is also stored in the RAM 20. Thereafter, the program goes to the step S9.

The other operations of the third embodiment is the same as those of the first embodiment.

Figure 7:
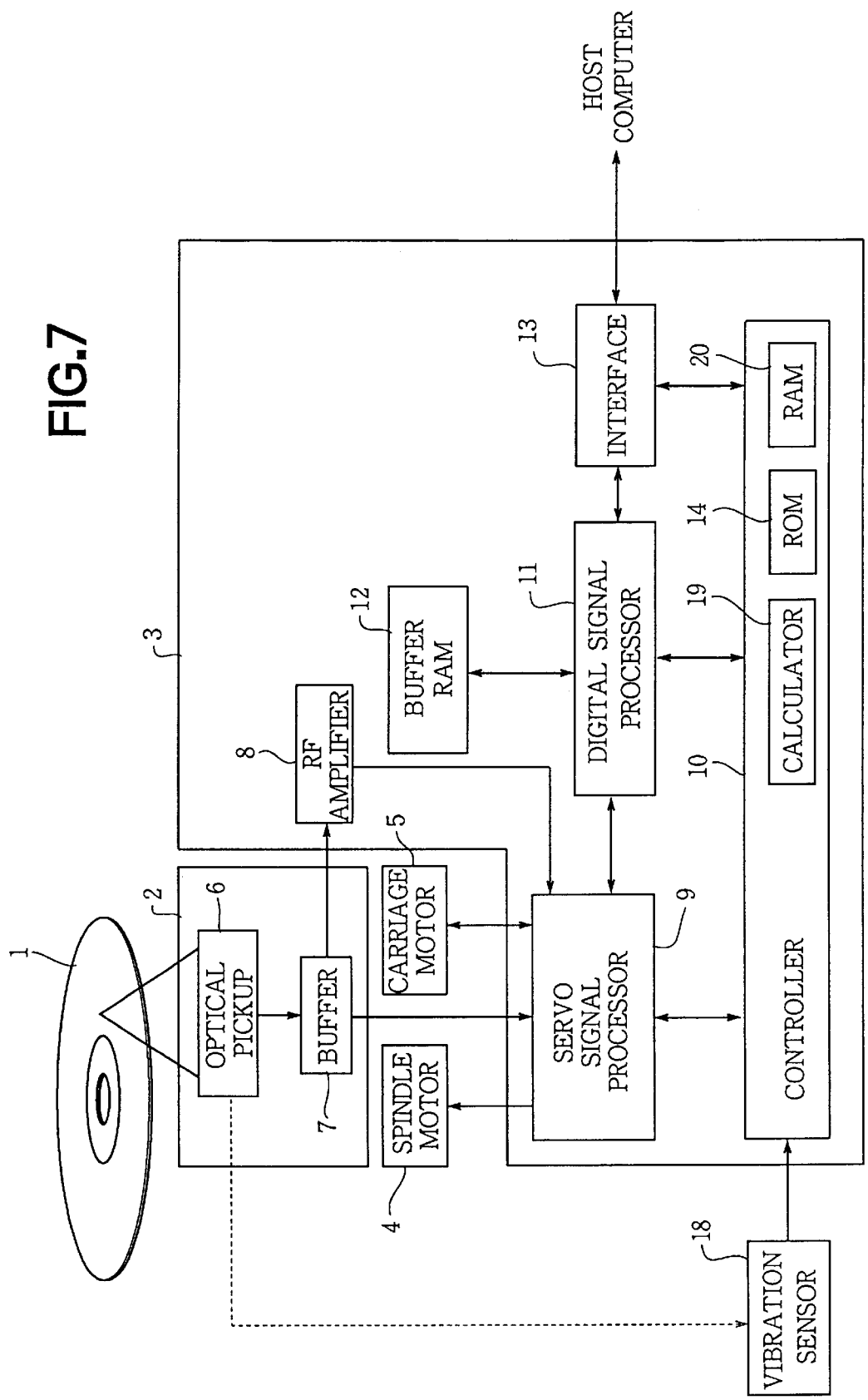
FIG. 7 is a schematic block diagram of a CD-ROM reading system of a fourth embodiment of the present invention.

Referring to FIG. 7, the CD-ROM reading system of the fourth embodiment is provided with a vibration sensor 18 mounted on a housing of the optical pickup 6, for example. The vibration sensor 18 comprises an acceleration sensor which generates a signal representing an acceleration of the vibration exerted on the optical pickup. The output of the vibration sensor 18 is fed to a calculator 19 of the controller 10. The calculator 19 calculates an additional vibrational quantity dependent on the level of the output signal of the vibration sensor 18.

Figure 8:
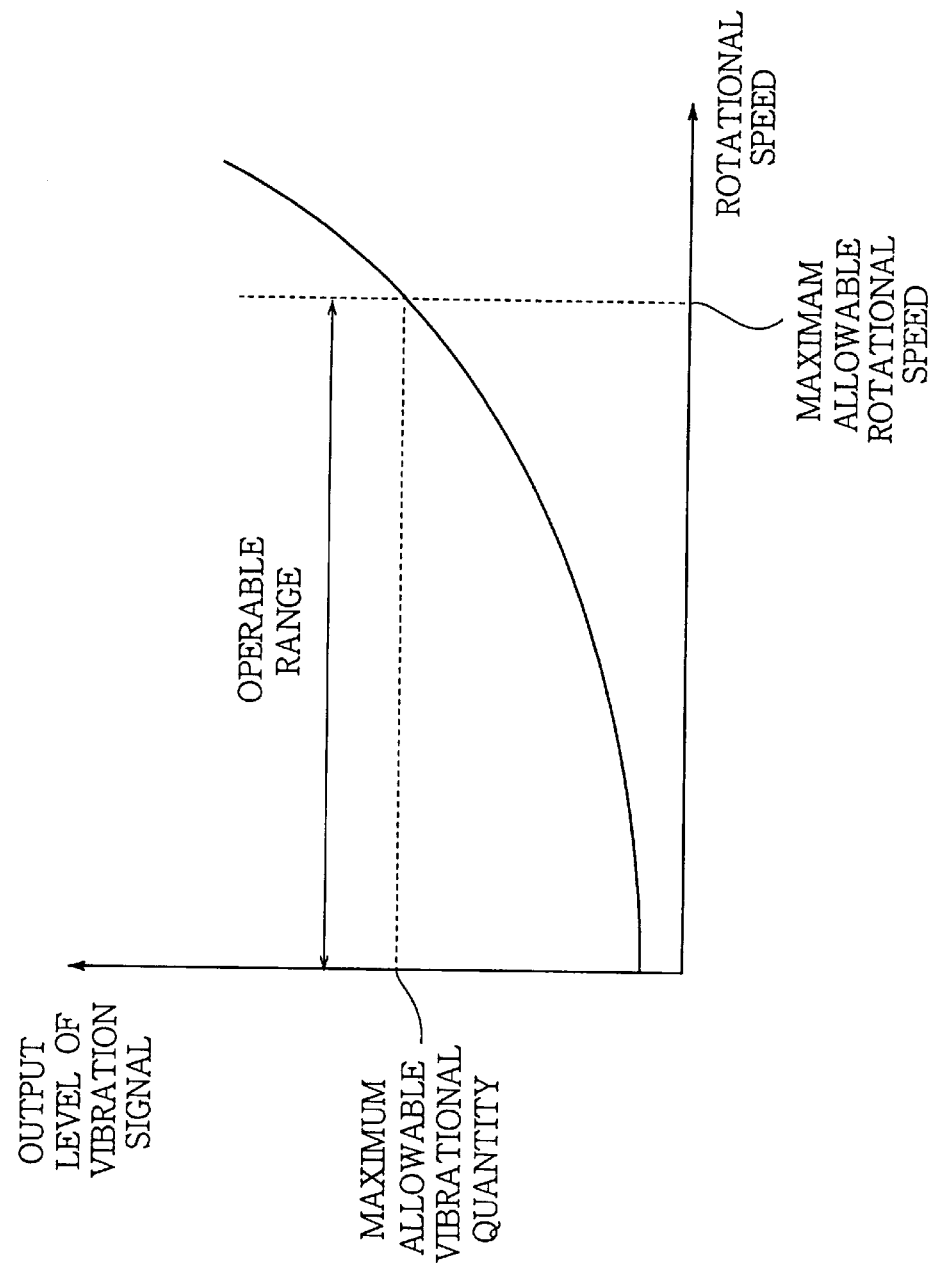
FIG. 8 is a graph showing a relationship between a rotational speed of a spindle motor and an output of a vibration sensor provided in the CD-ROM reading system of FIG. 7.

More particularly, as the speed of the spindle motor 4 increases, the output level of the vibration sensor 18 increases at a large rate as shown in FIG. 8. At the same time, the amplitude of the tracking error signal also increases. When the calculated additional vibrational quantity reaches the maximum allowable vibrational quantity stored in the ROM 14 of the controller 10, the rotational speed of the spindle motor 4 at that time is stored in the RAM 20 as the maximum allowable rotational speed.

The operation of the fourth embodiment of the present invention will be described hereinafter with reference to FIG. 9 wherein steps designated by the same references as in FIG. 2a show the same operations.

The disc 1 is loaded in the CD-ROM reading system (step S1), the focus set (step S2), and the spindle motor 4 is started (step S3). Thereafter at a step S25, the controller 10 compares the additional vibrational quantity calculated in accordance with the output signal of the vibration sensor 18 with the maximum allowable vibrational quantity stored in the ROM 14. When additional vibrational quantity reaches the maximum allowable vibrational quantity, the rotational speed at that time detected by the rotational speed detector 17 is stored in the RAM 20 as the maximum allowable rotational speed at a step S26. Thereafter, the program goes to the step S7 where the track-following servo system is closed. If the additional vibrational quantity is smaller than the maximum allowable vibrational quantity, the program goes to a step S27 where the rotational speed at that time is compared with the maximum rotational speed capable by the CLV. When the rotational speed is lower than the maximum rotational speed of the CLV, the spindle motor 4 further increases the speed thereof and returns to the step S25. When it is determined at the step S27 that the speed reached the maximum rotational speed, the program proceeds to the step S7.

Figure 9:
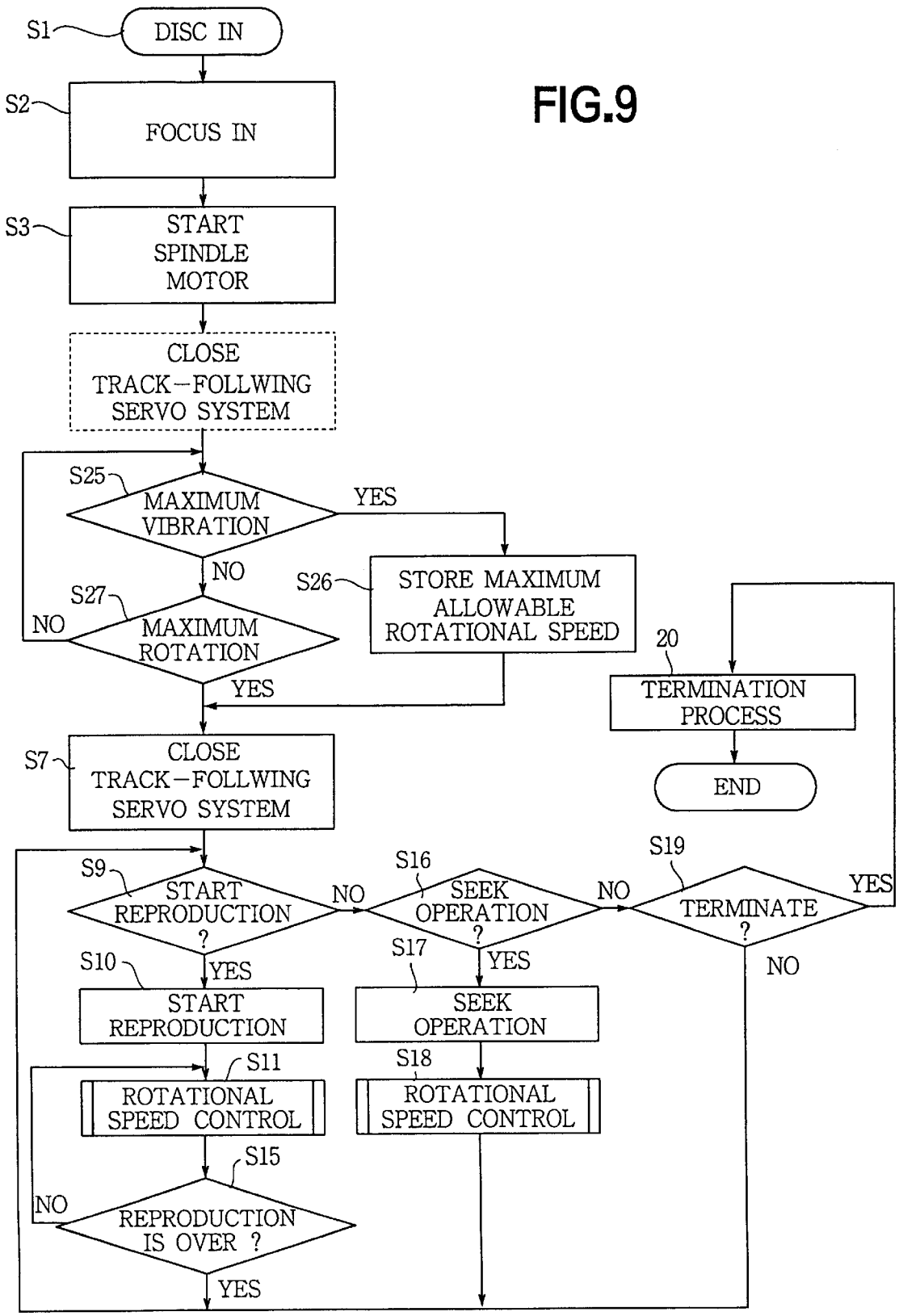
FIG. 9 is a flowchart describing the operation of the CD-ROM reading system of FIG. 7.

The present embodiment may further be modified so that the track-following servo system is closed directly after the step S3 in the same manner as in the third embodiment, as shown by a dotted line in FIG. 9

Figure 11:
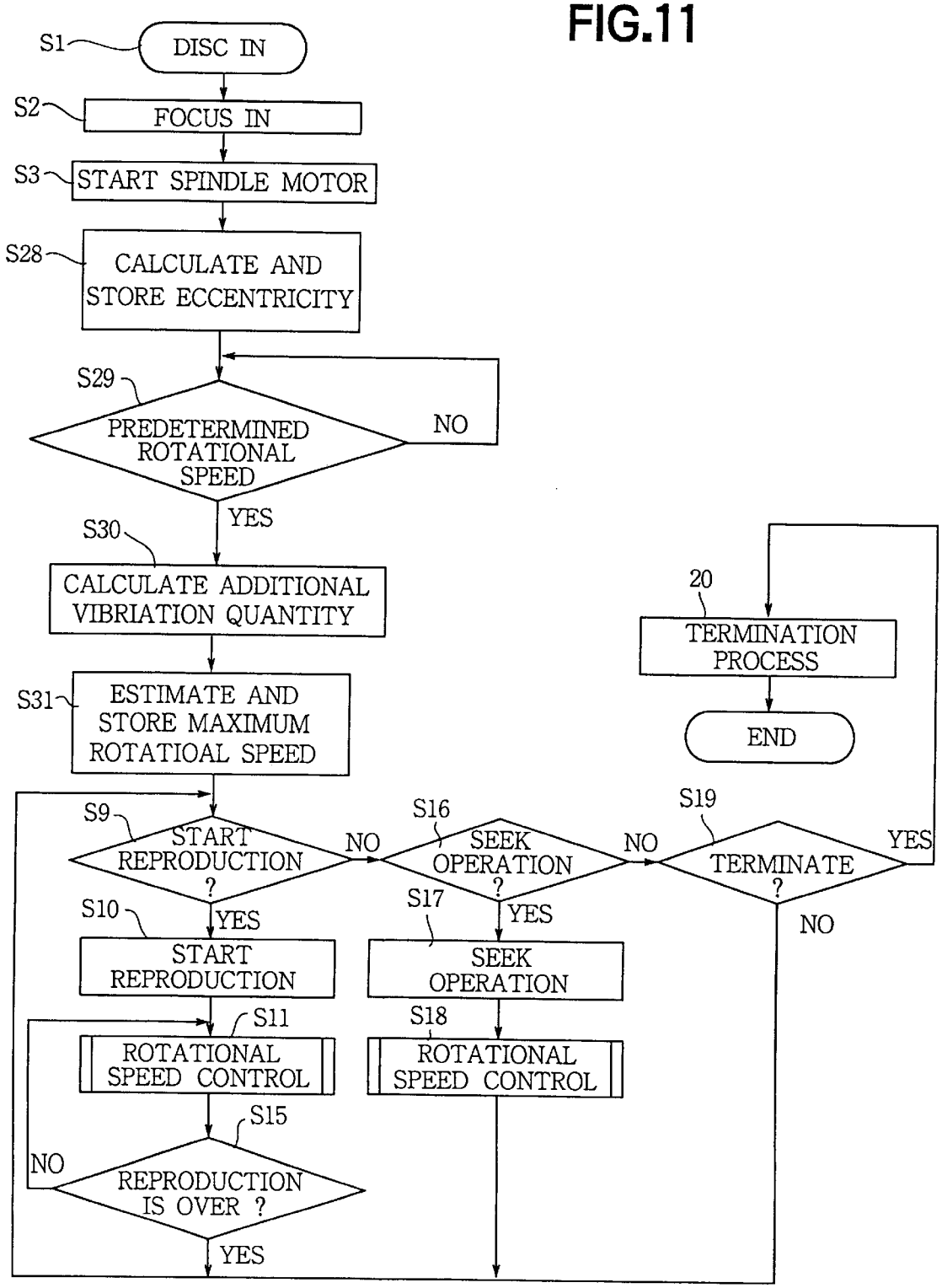
FIG. 11 is a flowchart describing the operation of the CD-ROM reading system of a fifth embodiment of the present invention.

FIG. 11 shows the operation of the fifth embodiment of the present invention wherein the additional vibrational quantity is estimated.

Referring to FIG. 11, when the program proceeds from the step S3 to a S28, the eccentricity of the disc 1, that is the relative displacement of the optical pickup 6 at a low rotational speed, is calculated and stored in the RAM 20.

Thereafter, the rotational speed of the spindle motor 4 is increased and the track-following servo system is closed. At a step S29, the rotational speed is compared with a predetermined speed stored in the ROM 14 of the controller 10.

When the detected rotational speed coincides with the predetermined speed, the additional vibrational quantity generated at that rotational speed is calculated in accordance with the actuator driving signal as in the third embodiment at a step S30. Thereafter at a step S31, a maximum allowable rotational speed which is liable to cause the maximum allowable vibrational quantity stored in the ROM 14 is estimated. Namely, the maximum rotational speed is obtained in accordance with the relationship between the predetermined rotational speed and the additional vibrational quantity resulting from the speed. Thereafter the program goes to the step S9.

The fifth embodiment may be modified so that the track-following servo system is closed after the step S3 so that the displacement at the low rotational speed is calculated based on the actuator driving signal as in the step S21 in FIG. 5 of the third embodiment instead of on the tracking error signal.

The number of the predetermined rotational speed stored in the ROM 14 may be more than one. Hence the maximum allowable rotational speed can be estimated more accurately in accordance with the additional vibrational quantity, which increases nonlinearly with respect to the rotational speed.

In the sixth embodiment of the present invention, a rotational speed at which the additional vibrational quantity is likely to be generated is determined beforehand. For example, in the CD-ROM reading system capable of reading information at 8-multiplied speed at the maximum rotational speed of 4200 r.p.m., the additional vibrational quantity is likely to occur at about 3000 r.p.m. Instead of detecting the relative displacement at the low rotational speed, that is the eccentricity of the tracks, the relative displacement at the predetermined rotational speed, that is 3000 r.p.m., is detected. The difference between the displacement and the additional vibrational quantity at the predetermined rotational speed is calculated, and the displacement of the pickup when the maximum allowable vibrational quantity is liable to be generated can be calculated. Hence the maximum allowable rotational speed is quickly calculated, thereby decreasing the time for the CD-ROM reading system to start the reading or the reproduction of the information.

The present invention may be applied to automotive and portable reproducing devices wherein the components thereof are liable to deteriorate in rigidity with time due to external disturbances such as vibrations and changes in temperature. In such applications, the additional vibrational quantity or the relative displacement is detected at every radial position of the recording area of the disc. Thus, the maximum allowable vibrational quantity is calculated in accordance with each radial position. The corresponding maximum allowable rotational speed is hence updated. The maximum allowable rotational speed may be updated not at every radial position but periodically. For example, a new maximum allowable rotational speed is obtained at a break of a command process, which occurs at an interval of several ten minutes.

From the foregoing it will be understood that the present invention provides a system for reading information from a disc such as a CD-ROM wherein the rotational speed of the disc is controlled so as to be rotated at the maximum possible speed without causing excessive vibration of the disc. Hence the information on the disc is always quickly and stably reproduced.

While the invention has been described in conjunction with preferred specific embodiment thereof, it will be understood that this description is intended to illustrate and not limit the scope of the invention, which is defined by the following claims.

What is claimed is:

1. A system for reading information recorded on a disc comprising:
   a reading device for reading information recorded on an optical disc;
   a rotating device for rotating the optical disc;
   control means for controlling the rotational device so as to rotate the disc at a higher speed than an ordinary speed;
   detector means for detecting a relative displacement between the reading device and the optical disc, caused by rotating the disc by the rotating device at a speed higher than an ordinary speed under the control of the control means;
   determining means for determining that the displacement reaches a predetermined allowable value;
   rotating speed detector means for detecting a maximum rotating speed of the optical disc within a range dependent on the predetermined allowable value;
   the control means being provided for controlling the rotating device so as to rotate the optical disc at an angular velocity which does not exceed the maximum rotating speed detected by the rotating speed detector means, and
   a memory for storing a predetermined allowable value.

2. The system according to claim 1 further comprising calculating means for calculating a radial position of the reading device at the maximum rotating speed, the control means being provided for controlling the rotating device so as to rotate the optical disc at a constant angular velocity in order to read information recorded in an area inside the calculated radial position.

3. The system according to claim 2 wherein the control means being provided for controlling the rotating device so as to rotate the optical disc at a constant linear velocity in order to read information recorded in an area outside the calculated radial position.

4. The system as claimed in claim 1 wherein said control means comprises a calculator for calculating a maximum allowable vibrational quantity.

5. The system for reading information recorded on a disc according to claim 1 wherein said displacement is detected based on a tracing actuator driving signal when a track-following servo system is closed.

* * * * *